United States Patent [19]
Bejarano

[11] Patent Number: 5,215,199
[45] Date of Patent: Jun. 1, 1993

[54] RACK FOR SUPPORTING ITEMS SUCH AS BOTTLES

[76] Inventor: Pedro Bejarano, 11807 Acadian Dr., Houston, Tex. 77099

[21] Appl. No.: 821,583

[22] Filed: Jan. 16, 1992

[51] Int. Cl.⁵ ............................................. A47F 5/00
[52] U.S. Cl. .................................. 211/74; 211/181; 211/189
[58] Field of Search .................... 211/74, 181, 189; 248/175

[56] References Cited

U.S. PATENT DOCUMENTS

| | | | |
|---|---|---|---|
| 2,314,490 | 3/1943 | Goldman | 211/181 X |
| 2,724,511 | 11/1955 | Morgan | 248/175 X |
| 3,003,644 | 10/1961 | Hildebrand | 211/74 |
| 3,160,278 | 12/1964 | Varkala | 211/74 |
| 3,680,712 | 8/1972 | Jurasek | 211/181 |
| 3,915,097 | 10/1975 | Young | 211/181 |
| 4,998,631 | 3/1991 | Fridjhon | 211/74 |

Primary Examiner—Robert W. Gibson, Jr.
Attorney, Agent, or Firm—Arnold, White & Durkee

[57] ABSTRACT

A rack which may be assembled and disassembled without the use of conventional threaded fasteners is provided. The rack may consist of welded wire construction of various components which are secured in a desired relationship by engagement elements which engage each support member through use of spring elements placed in tension. Front and rear support members may be engaged by a top element which engages both members through use of a spring, and by one or more base members which engage both the front and rear members through use of a spring.

10 Claims, 4 Drawing Sheets

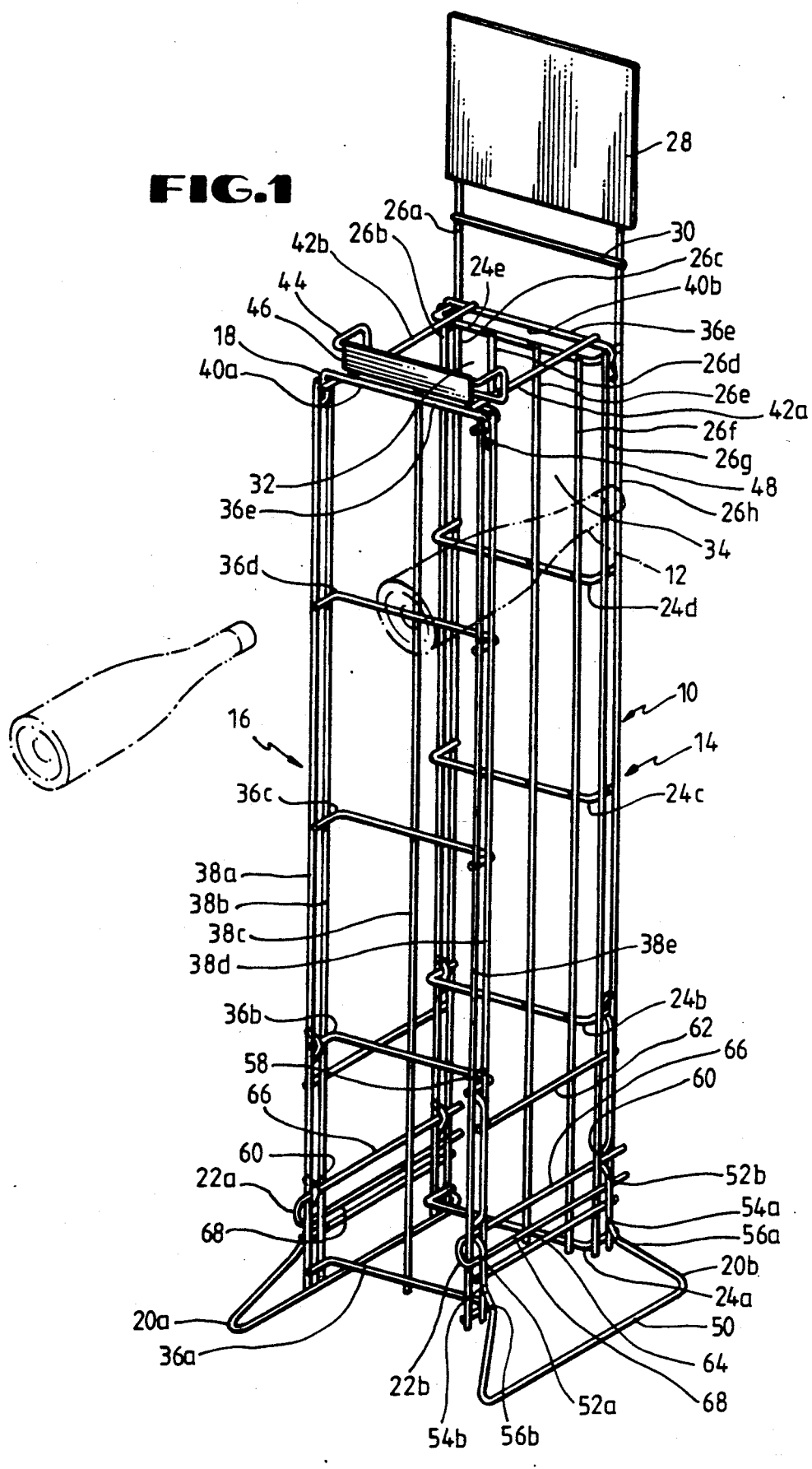

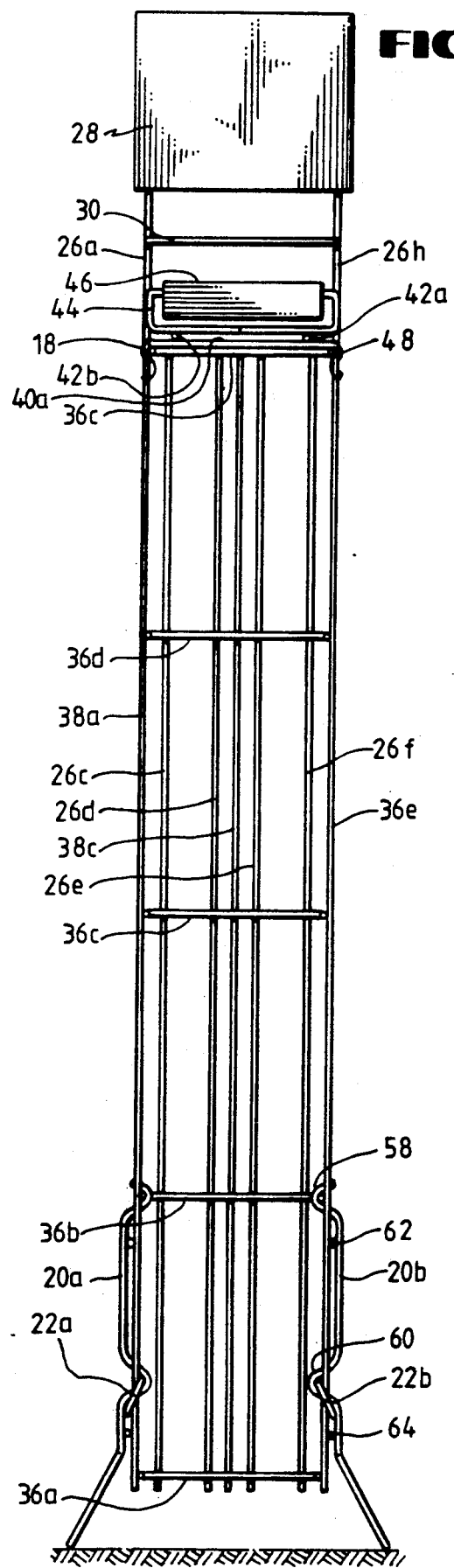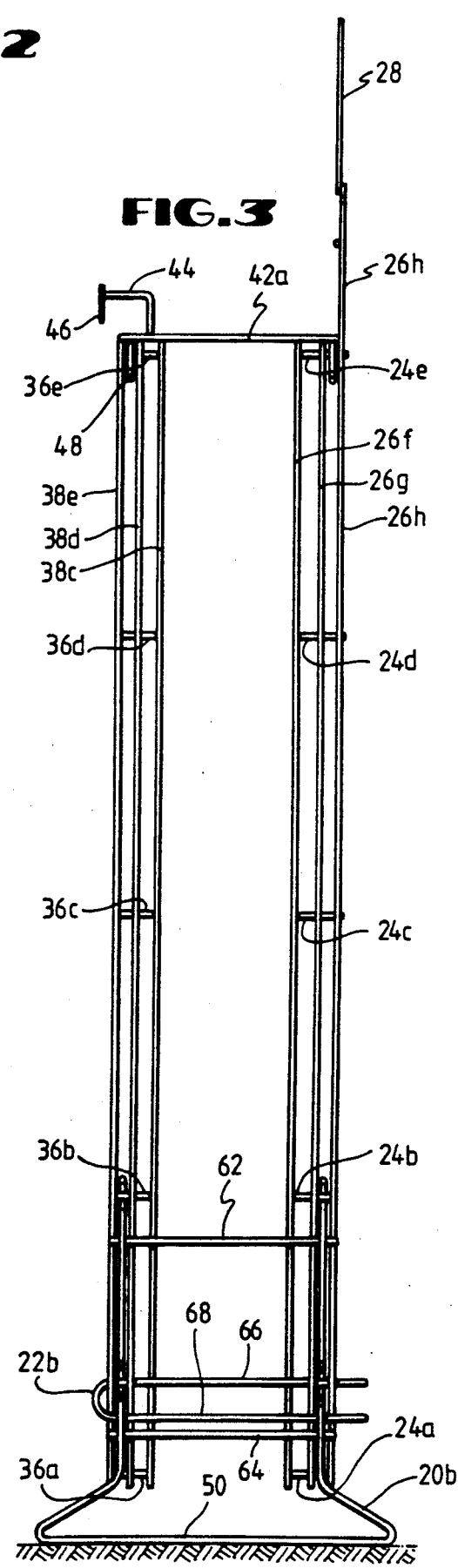

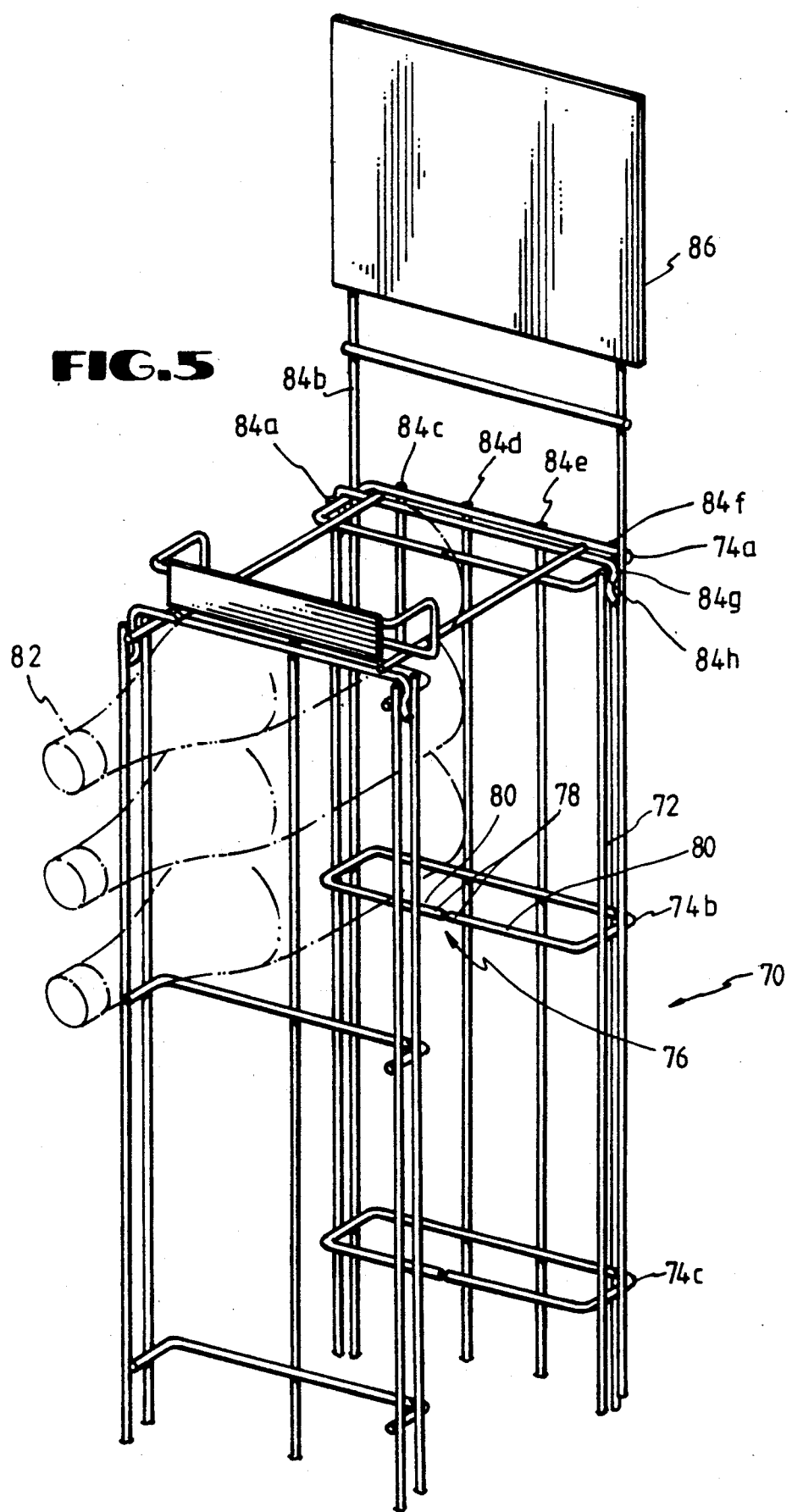

RACK FOR SUPPORTING ITEMS SUCH AS BOTTLES

BACKGROUND OF THE INVENTION

The present invention relates generally to racks for supporting various items, and more specifically relates to racks for supporting items such as bottles, such as wine and champagne bottles, which racks may be readily assembled and disassembled for transport.

Many types of stands or racks for supporting bottles, such as wine and champagne bottles, are currently known. One popular type of rack, which is particularly frequently used as a "point of sale" rack for displaying wine bottles, is a welded wire rack which supports the bottles in vertical columns through use of a wire grid. Such welded racks typically include a plurality of horizontal wire supports for supporting one or more bottles. These conventional racks typically are built to hold two or more columns of bottles.

These conventional welded racks suffer from the drawback that by virtue of their welded construction, and their resulting bulk, they are relatively difficult and expensive to transport. Additionally, where the racks are packaged, such a for shipping, not only do they require relatively large boxes or crates to house the entire assembly, but also additional packaging to help protect the racks from damage during shipment.

Accordingly, the present invention provides a new rack for supporting bottles or similar items which rack may be readily assembled and disassembled from components which may be relatively compactly arranged, such as for shipping.

SUMMARY OF THE INVENTION

The present invention provides a rack which may be assembled or disassembled. In one preferred embodiment, the rack is adapted to support bottles through use of two primary support members, a front support member and a read support member. The front and read support members are held in generally secure, parallel relation to one another through use of a securing assembly. This securing assembly preferably includes two portions, a base assembly and a clamp assembly. The base assembly engages the front and rear support members at locations proximate the bottom of each member, while the clamp assembly engages the front and rear support members proximate an upper location on each member.

The base assembly and the clamp assembly each maintain the front and rear support panels in secure, generally fixed relation by engaging each member while in tension. In one particularly preferred embodiment, the clamp assembly includes a first pair of spring sections adapted to engage the front support member while in tension, and a second pair of spring sections adapted to engage the rear support section, and cross elements for retaining the member with the first pair of spring sections and the member with the second pair of spring sections at a fixed distance from one another. This particularly preferred embodiment includes a base assembly having a first member adapted to engage both the first and second support members, and a retention member which will engage all three members when the base member is in tension. In the preferred embodiments disclosed herein, the front and rear support members, the base assembly, and the clamp assembly are all formed of wire elements, and the spring sections which operate in tension include resiliently moveable portions of the respective members.

BRIEF DESCRIPTION OF THE DRAWINGS

FIG. 1 depicts an exemplary embodiment of a collapsible bottle rack in accordance with the present invention, illustrated from a perspective view.

FIG 2 depicts the rack of FIG. 1 from a front, vertical view.

FIG. 3 depicts the rack of FIG. 1 from a side, vertical view.

FIG. 5 depicts an alternative configuration of a rack in accordance with the present invention illustrated from a prospective view.

DETAILED DESCRIPTION OF PREFERRED EMBODIMENTS

Figure 4:
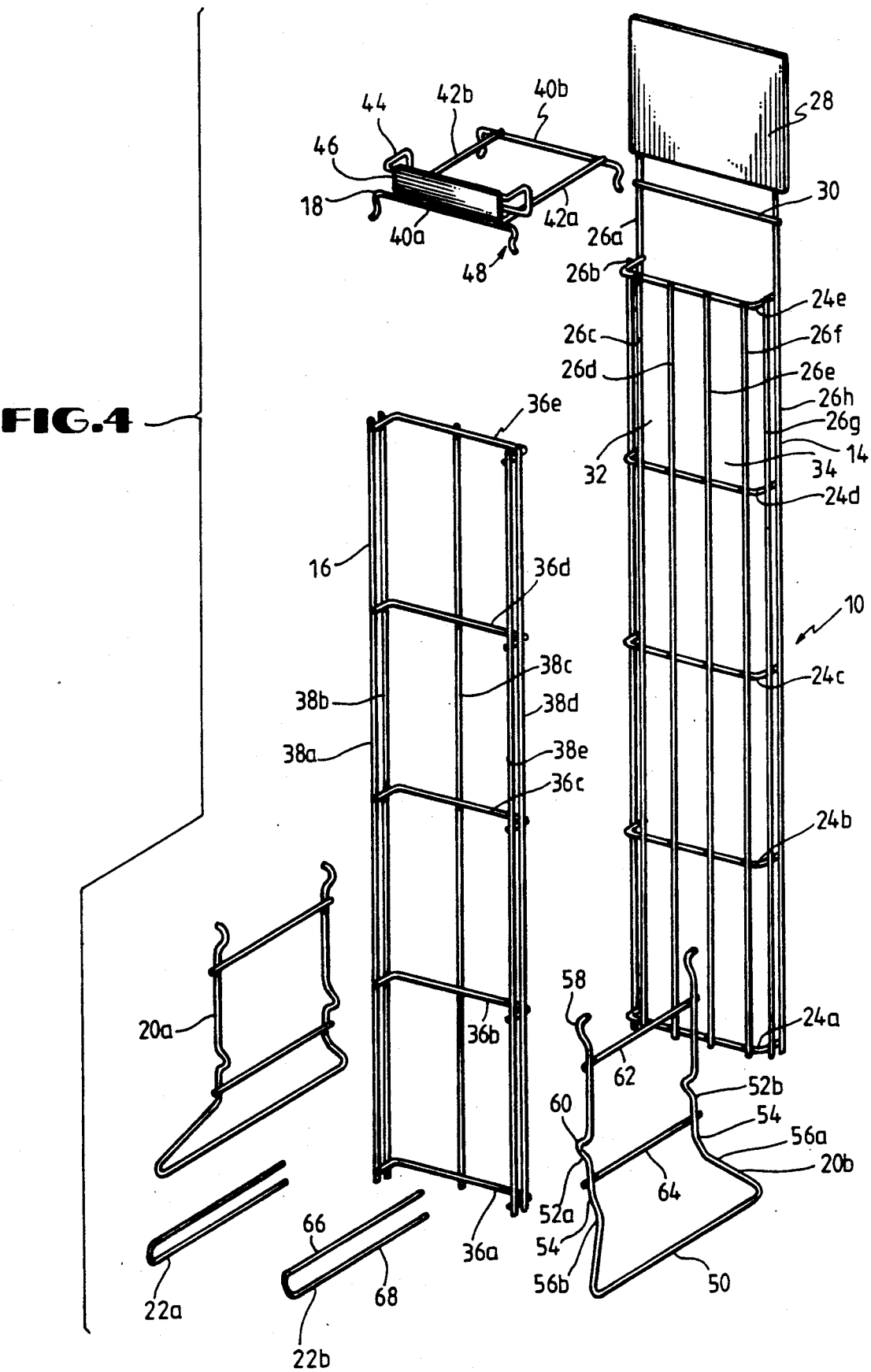
FIG. 4 depicts the rack of FIG. 1 in an exploded, perspective view.

Referring now to the drawings in more detail, and particularly to FIG. 1, therein is depicted a collapsible bottle rack 10 in accordance with the present invention. Collapsible bottle rack 10 is depicted in an assembled, functional state, with a wine bottle 12 depicted in phantom representation in an intended placement. For clarity of the following discussion, reference is also made to FIGS. 2 and 3, and in particular to FIG. 4 where the rack is depicted in an exploded view. Collapsible rack 10 includes a rear support member 14 and a front support member 16. Rear support member 14 and front support member 16 are intended to be held in generally parallel spaced relation to one another through cooperation of an upper clamp assembly 18 and a base assembly, indicated generally at 19. In the depicted exemplary embodiment, this base assembly 19 includes pair of base members 20a, 20b, which will each be secured in position by a generally U-shaped retention clip 22a, 22b.

Rear support member 14 includes a generally U-shaped profile for a substantial portion of its length. Rear support member 14 is preferably a welded wire assembly including a plurality of generally U-shaped horizontal cross-members 24a-24e secured in generally perpendicular relation to a plurality of vertically extending support elements 25a-h. In an embodiment as depicted herein, wherein collapsible rack 10 is designed to hold two columns of bottles, each horizontal cross-member will have a width (access the "based " of the "U") of approximately 6.875 inches.

As can be seen in the Figures, outer vertical support elements 26a and 26h in the embodiment of FIG. 10 extend above upper horizontal cross-member 24e to form supports for display plate 28. Display plate 28 may be painted, or otherwise marked with identifying information, such as labels or advertising. A cross-brace 30 extends between vertical support elements 26a and 26h to provide additional stability therefore.

In an embodiment as depicted herein, wherein rack 10 is designed to hold column stacks of twelve bottles each, horizontal cross-members 24 will be spaced approximately 10.125 inches apart, and vertical support elements 26 will preferably extend at least the full distance between bottom horizontal cross-member 24a and top horizontal cross-member 24e. Vertical support elements 26a-h are arranged so as to provide optimal stability for rear support member 14. For example, in the illustrated embodiment, panel 14 includes two vertical support elements 26a, 26b and 26g, 26h and each "side"

of the panel (and on the "sides" of the "U" shaped section); and includes four vertical elements 26c, 26d, 26e, and 26f on the rear of the member (i.e., on the "bottom" of the generally U-shaped section). These vertical support elements each lie in generally parallel relation to one another. Central elements 26d and 26e are arranged so as to not only provide structural integrity for rear panel 14 but also to define apertures 32 and 34 which will receive the necks of bottles being supported by rack 10.

Front support member, like rear support member 14 includes a generally U-shaped profile for at least a substantial portion of its length; and further includes a plurality of horizontal, generally U-shaped cross members 36a-e, which are secured, in generally perpendicular relation to vertical wire elements 38a-e, again such as by welding. Vertical support elements 38a-e again preferably extend the entire distance between top and bottom horizontal cross-members 24a and 24e. As with rear support member 14, in an embodiment as depicted herein, wherein rack 10 is designed to hold column stacks of twelve bottles each, horizontal cross-members 36a-e will preferably be spaced approximately 10 inches apart. Again, vertical support elements 38a-e are arranged so as to provide optimal stability for front support member 16. In the illustrated embodiment, front support member 16 includes two vertical support elements 38a, 38b, 38d, and 38e on each "side" of the panel, and includes a single support element proximate the center line of the panel. As can be appreciated from FIG. 1, center vertical support element 38c serves to keep each column of bottles correctly positioned.

Top clamp 18 and base assembly 19 (formed of base members 20a, 20b and clips 22a, 22b) form a securing assembly which will maintain rear support member 14 and front support member 16 in a spaced generally parallel relation. Top clamp 18 includes two generally parallel clamping rods 40a and 40b, held in spaced relation by cross-rods 42a, 42b. An additional bracket 44 and plate 46 may be included to again provide a location for signage, etc. Clamping rods 40a, 40b have inwardly projecting indentions, as indicated at 48, adapted to tightly engage upper horizontal cross-member 36e of front member 16, between vertical members 38a and 38b on one side, and on the opposing side, between vertical members 38d and 38e; and to similarly engage upper horizontal member 24e of rear panel member 14 between vertical supports 26a and 26b on one side and between vertical supports 26g and 26h on the opposing side. Projections 48 are deflectable, by virtue of their construction, and are conformed, along with the remainder of clamping rods 40a, 40b, to deflect to engage horizontal cross-members 26e and 36e as described, and to remain somewhat in tension to tightly engage such horizontal cross-members when clamping rods 40a and 40b rest against the horizontal cross-members. The rigid connection between vertical support members 26 and upper horizontal support member 24e on rear panel member 14, and between vertical support members 28 and horizontal support member 36e on front panel support member 16 provides an essentially non-yielding surface against which projections 48 may engage. Thus, when upper clamp 18 is clamped to front and rear support members 16 and 14, respectively, the upper ends of such members are retained in a generally secure spaced relationship.

Base assembly 19 includes two base members 20a, 20b which each preferably include a generally flat floor engaging portion 50, and a pair of spaced engagement sections 52a and 52b. Preferably, each base member, including engagement sections 52a and 52b and floor engaging portion 50 will be formed of a single length of wire or other metal. The transition between engagement portions 52a and 52b and floor engaging portion 50 may include a first air of bends, as indicated at 54, such that each base member 20a, 20b will extend outwardly relative to the vertical outer extensions of front and rear support members 16 and 14 as to provide a wider "footprint", and therefore optimal stability for rack 10. Additionally, a second par of bends, as indicated at 56, may be included to accommodate a transition between engagement portions 52a and 52b whereby floor engaging portion 50 may be longer than the space between engagement portions 52a and 52b. This gives a greater front to rear "footprint" for rack 10, and further improves the stability of the rack. Each engagement portion 52a, 52b includes a hook 58 which will engage horizontal cross-member 36b of front support member 16 and 24b of rear support member 14. Additionally, each engagement portion 52a, 52b includes an engagement indention 60. Each base member 20a, 20b further includes a pair of cross-members 62, which serve not only to maintain engagement portions 52a, 52b in the desired spaced relationship relative to one another, but which also provide leverage surfaces as will be described later herein.

Each base portion 20a, 20b is held in place by a securing clip 22a, 22b. Each securing clip 22a, 22b is preferably a generally elongated U-shaped member, preferably formed of wire.

Base members 20a, 20b are each affixed to front support member 16 of rear support member 14 by generally simultaneously engaging hook 58 of leading engagement portion 52a with that portion of horizontal support member 36b between upper of vertical supports 38d and 38e, and engaging hook 58 of rear engagement portion 52b with that portion of horizontal support 24b between vertical supports 26g and 26h. Base member 20b may then be pivoted inwardly until engagement indentions 60 extend between, and beyond the inner portion of the described upright members. As is most clearly depicted in FIG. 2, cross-member 62 and 64 will lie against the described vertical supports and prevent further travel of base member 20b relative to front support member 16 and rear support member 14. When base member 20b is in such described position, clip 22b will be inserted such that one leg 66 will engage the inner side of extension 60, between extension 60 and the inner surface of the uprights, and such that the other leg 68 of clamp 22b will extend between base member 20b and the exterior surface of the described uprights. The dimensions of inwardly extending engagement indention 60 will be selected, relative to the diameter of the wire utilized for clamp 22b to assure that tension in base member 20b will provide a tight fit between base member 20 and front and rear support members 16 and 14, respectively. Base member 20a will be secured to the opposite side of front support member 16 and rear support member 14 in a similar manner.

The unit as assembled provided an exceptionally rigid unit capable of supporting a relatively large volume of bottles within a minimum of floor space. For example, in the embodiment as depicted in FIGS. 1-4, where five horizontal cross-members are spaced approximately 10 inches from one another, the rack is capable of supporting 24 conventional wine or champagne bottles. Each horizontal member will support up to three bottles which will be placed in the space extending above the horizontal member to the next higher horizontal member. Additionally, in the depicted embodiment, the distance between the front of front support member 16 and the rear of rear support member 14, when rack 10 is assembled, will be about 8 inches. For such an application, for supporting 24 bottles, as described herein, construction of rack 10 primarily from ¼ inch steel has been found to be satisfactory. It has also been found satisfactory to form the base members out of slightly larger steel, such as, for example, 5/16 inch diameter wire.

Referring now to FIG. 5, therein is depicted a top portion of an alternative embodiment of a collapsible rack in accordance with the present invention. As depicted in FIG. 1, the embodiment of FIGS. 1-4 is designed to support bottles with the neck being placed to the inside or back of the rack, with the bottles being removed by pulling them out bottom first. The embodiment of FIG. 5 is configured to support the bottles with the neck extending to the front.

The construction of all components of rack 70 is identical to that of rack 10, with the exception of the construction of rear support member 14 of rack 10. Rack 70 includes a rear support member 72 which differs in that it is assembled in rack 70 in a relatively reversed position relative to the placement of rear support member 14 of rack 10. That is, the generally U-shaped configuration is in a comparable position to the U-shaped configuration of front support member 16, rather than in a generally opposing relation as depicted in FIGS. 1-4. Additionally, rear support member 72 differs in that horizontal support members 74a-c (in the partial section depicted) extend toward each other to a central portion, indicated generally at 76, of rear support member 72. Ends 78 may even be joined together such as by welding, if desired. As is depicted in FIG. 5, inwardly projecting extensions 80 of horizontal support members (i.e., 74b as depicted) provide a support surface for supporting the bottoms of bottles, whereby the necks of the bottles 82 (depicted in phantom) may extend to front of the rack. Vertical support members 84 provide supports for the bottles, and central vertical support members 84c-84f, prevent extension of the bottles beyond rear support member 72. As will also be appreciated, where a plate is included for signage display or the like, that plate 86 will be on the relative opposite side of vertical support elements 84b, 84f relative to the placement of plate 28 of collapsible rack 10 of FIGS. 1-4.

Many modifications or variations may be made in the techniques and structures described and illustrated herein without departing from the spirit and scope of the present invention. For example, structures other than wire construction may be utilized. For example, where desired, plates could be used to form the sides of the front and rear support member, rather than the parallel wires as specifically described and illustrated herein. Similarly, base members as described herein could be retained in place through use of a single locking rod rather than the U-shaped clip depicted herein. Additionally, in an embodiment such as FIG. 5, rather than using a plurality of vertical support members to form the rear portion of the support member, a lattice or mesh could be utilized to provide the requisite support. Accordingly, it should be readily understood that the techniques and structures described and illustrated herein are illustrative only and are not to be considered as limitations upon the scope of the present invention.

What is claimed is

1. A rack which may be assembled and disassembled, comprising:
   a rear support member;
   a front support member; and
   a securing assembly adapted to secure said rear support member and said front support member in secure, generally parallel relation, such securing assembly including,
   a base assembly adapted to selectively engage said rear support member at a first location and to engage said front support member at a first location, and to retain said first locations of said front support member and said rear support member at a generally fixed spaced distance from one another, said base assembly including sections which are in tension when said base assembly is secured to said rear support member and to said front support member, and
   a clamp assemble adapted to releasable engage said rear support member at a second location and a front support member at a second location, and to maintain said second locations of said front and rear support members at a generally fixed spaced distance from one another, said clamp assembly including sections which are in tension when said clamp assembly is engaged with said rear support member and said front support member.

2. The rack of claim 1, wherein said front and rear support members are each formed of wire members.

3. The rack of claim 1, wherein said front support member includes a plurality of horizontal support members, ad wherein said rear support member includes a plurality of horizontal support members.

4. The rack of claim 1, wherein said base assembly includes a first base member adapted to engage said front and rear support members on a first side, and a second base member adapted to engage said front and rear support members on a second, opposing, side, and wherein said base assembly further comprises first and second retention members, each retention member adapted to engage one of said base members, and at least one of said rear support member and front support member, when said base member is in tension, said retention member further adapted to retain said base member in tension.

5. A bottle rack, which rack may be assembled and disassembled, comprising:
   a rear support member;
   a front support member, said front support member having at least one support element for supporting at least one of said bottles when said rack is assembled; and
   a securing assembly adapted to secure said rear support member and said front support member in a generally secure, spaced and parallel relationship through spring sections, said securing assembly comprising,
   a securing clamp adapted to engage said rear support member and said front support member at a first location on each, and to maintain said rear support member and said front support member in a generally spaced relation proximate said first locations, said securing clamp having a first spring section for engaging said rear support member and a second spring section for engaging said front support member, and a base assembly adapted to engage said rear support member and said front support member proximate the second location on each, and to maintain said second locations in a generally secure, spaced relationship from one another, said spaced relationship between said front and rear members proximate said second locations being generally the same as said spaced relationship between said rear support member and said front support member proximate said first locations, said base assembly having a first spring section which is actuated to engage said front support member and a second spring section which is actuated to engage said rear support member.

6. The rack of claim 5, wherein said rear support member is formed of wire elements, and comprises a plurality of vertical support elements and a plurality of horizontal support elements.

7. The rack of claim 5, wherein said front support member is formed of wire elements, and comprises a plurality of vertical support elements and a plurality of generally horizontal support elements.

8. The rack of claim 5, wherein said base assemble comprises:
- a first base member, formed at least partially of wire, and adapted to engage said front support member and said rear support member on a first side;
- a second base member, formed at least partially of wire, and adapted to engage said front support ember and said rear support member on a second, opposing side;
- a first retention member engageable with said first base ember and with said front and rear support members when said first and second spring sections of said first base member are in tension, and adapted to retain said spring sections in tension; and
- a second retention member engagable with said second base member and with said front and rear support members when said first and second spring sections of said first base member are in tension, and adapted to retain said spring sections in tension.

9. The rack of claim 5, wherein said securing clamp includes a pair of spaced wire element, each wire element having two spring sections.

10. A rack for supporting bottles, which rack may be assembled and disassembled, comprising:
- a rear support member formed of a plurality of wire elements, said plurality of wire elements including a first set of elements arranged in generally parallel relation to one another, and a second set of elements also arranged in generally parallel relation to one another, and also arranged in generally perpendicular relation to said first set of elements;
- a front support member formed at least partially of wire elements, said plurality of wire elements including a first set of elements arranged in generally parallel relation to one another, and a second set of elements arranged in generally parallel relation to one another, said second set of elements arranged in generally perpendicular relation to said first set of elements;
- a clamping member adapted to extend between said rear support member and said front support member and to releasably engage said rear support member and said front support member, and to maintain said rear support member and said front support member at a generally fixed separation distance at the points of engagement, said clamping member including at least one resiliently movable section adapted to engage said front support member, and further including at least one resiliently movable section adapted to engage said rear support member; and
- a base assemble adapted to selectively engage said rear support member and said front support member at a spaced distance said base assembly including, means for engaging said front and rear support members while in a state of tension, and comprising means for maintaining at least a degree of tension between said base assembly and said front and rear support members, when said base assembly is secured to said front and rear support members.

* * * * *